United States Patent
Anvari

(10) Patent No.: US 7,848,403 B1
(45) Date of Patent: *Dec. 7, 2010

(54) ENHANCED RECONDITIONING EQUALIZER FILTER CHAIN FOR MULTI-CARRIER SIGNALS

(75) Inventor: Kiomars Anvari, Alamo, CA (US)

(73) Assignee: Kiomars Anvari, Alamo, CA (US)

( * ) Notice: Subject to any disclaimer, the term of this patent is extended or adjusted under 35 U.S.C. 154(b) by 885 days.

This patent is subject to a terminal disclaimer.

(21) Appl. No.: 11/603,678

(22) Filed: Nov. 24, 2006

Related U.S. Application Data

(63) Continuation-in-part of application No. 10/782,158, filed on Feb. 20, 2004, now Pat. No. 7,305,041.

(51) Int. Cl.
*H03H 7/30* (2006.01)
*H04L 27/08* (2006.01)
*H03F 3/66* (2006.01)
*H03F 1/00* (2006.01)
*H04B 1/04* (2006.01)

(52) U.S. Cl. .............. 375/232; 375/229; 375/230; 375/345; 330/149; 330/151; 455/114.2; 455/114.3; 455/127.2

(58) Field of Classification Search ......... 375/295–297, 375/229–232; 370/203–208; 455/114.3, 455/114.2, 127.2; 330/52, 149–152
See application file for complete search history.

(56) References Cited

U.S. PATENT DOCUMENTS

| | | | | |
|---|---|---|---|---|
| 5,485,120 A | * | 1/1996 | Anvari | 330/151 |
| 5,594,385 A | * | 1/1997 | Anvari | 330/149 |
| 5,610,554 A | * | 3/1997 | Anvari | 330/52 |
| 5,986,499 A | * | 11/1999 | Myer | 330/52 |
| 7,142,831 B2 | * | 11/2006 | Anvari | 455/114.2 |
| 7,146,138 B2 | * | 12/2006 | Anvari | 455/114.3 |
| 7,649,927 B1 | * | 1/2010 | Anvari | 375/150 |
| 2004/0203540 A1 | * | 10/2004 | Anvari et al. | 455/114.3 |
| 2005/0185723 A1 | * | 8/2005 | Anvari | 375/260 |

\* cited by examiner

*Primary Examiner*—Mohammad H Ghayour
*Assistant Examiner*—Eboni Giles

(57) ABSTRACT

A technique for enhanced reconditioning equalizer filter chain for multi-carrier signals is described. The input to a transmitter chain is modified by an enhanced reconditioning equalizer filter chain, prior to being applied to the transmitter. The enhanced reconditioning equalizer filter chain modifies and smoothen the amplitude of the signal. The modified and smoothen signal has its picks reduced which results to lower Crest Factor. The input to the enhanced reconditioning equalizer filter chain could be a baseband, an intermediate frequency (IF) or radio frequency (RF) signal. When the signal is an IF or RF signal it needs to be down converted to baseband before applied to enhanced reconditioning equalizer filter chain. The enhanced reconditioning equalizer filter chain could be implemented in digital or analog domain.

5 Claims, 4 Drawing Sheets

ENHANCED RECONDITIONING EQUALIZER FILTER CHAIN FOR MULTI-CARRIER SIGNALS

This application is a continuation-in-part of U.S. patent application Ser. No. 10/782,158 filed Feb. 20, 2004 now U.S. Pat. No. 7,305,041.

BACKGROUND OF INVENTION

The present invention relates to an enhanced reconditioning equalizer filter chain to boost the performance of any multi-carrier communication transmitter. The enhanced reconditioning equalizer filter chain input could be baseband, intermediate frequency (IF), or RF signal, and its output is the peak reduced and smoothen baseband signal that can be up converted to IF or RF. In any wireless communication system one of the critical sub-systems is the transmitter. This sub-system has a major contribution in cost, power consumption, and size of the system. The main reason is the requirement of multi-carrier communication transmitter sub-system for linear components. The higher the linearity, the higher the power consumption, cost and size. In order to minimize the cost, size and power consumption there is a need for techniques that overcome this problem. This invention conquers these challenges by using a simple and accurate enhanced reconditioning equalizer filter chain module used at the input to this sub-system.

SUMMARY OF INVENTION

According to the invention, a low-cost enhanced reconditioning equalizer filter chain, for use with any multi-carrier communication transmitter sub-system, uses a plurality of simple and accurate algorithm in conjunction with intelligent signal processing to improve signal handling of any wireless, optical, or wireline multi-carrier communication transmitter. By intelligent, it is meant that the algorithm has features of maintaining the signal emission and quality requirements while applying the enhanced reconditioning equalizer filter chain. The enhanced reconditioning equalizer filter chain uses the transmitter sub-system input which could be a baseband, an IF or RF signal as its input and conditions and smoothens the signal before applying to the transmitter sub-system. The conditioning and smoothening helps to boost the power handling of the transmitter sub-system or acts more linearly. The inputs to the enhanced reconditioning equalizer filter chain should be within a limit that can be handled by the enhanced reconditioning equalizer filter chain.

In a particular embodiment, the enhanced reconditioning equalizer filter chain algorithm comprises a signal processing module. The signal processor performs the signal conditioning and smoothening.

The invention will be better understood by reference to the following detailed description in conjunction with the accompanying drawings.

DESCRIPTION OF THE SPECIFIC EMBODIMENTS

In a first preferred embodiment of the invention, the enhanced reconditioning equalizer filter chain uses sub-harmonic sampling to convert RF or IF signals to digital baseband signal. In a second preferred embodiment the baseband signal is amplitude conditioned and smoothened using a. enhanced reconditioning equalizer filter chain. In a third embodiment the enhanced reconditioning equalizer filter chain adjust the in band signal by configuring a low pass filter in a feedforward loop and the out of band signal by a stand alone feedforward loop. In a fourth embodiment the multi-carrier baseband signal is down converted to produce baseband representative of each individual carrier. In a fifth embodiment the multi-carrier baseband signal is peak reduced by a peak reduction filter. In a sixth embodiment the peak reduced multi-carrier signal is down converted to produce peak reduced baseband representative of each individual carrier. In a seventh embodiment the individual baseband representation of the multi-carrier signal and individual baseband representation of the peak reduced multi-carrier signal are applied to an enhanced reconditioning equalizer filter to produce reconditioned and smoothen baseband representative of each individual carriers. In an eighth embodiment the reconditioned baseband representative of each individual carrier is up converted and combined to produce the reconditioned and smoothen multi-carrier baseband signal. In a ninth embodiment the out put of the enhanced reconditioning equalizer filter chain is used as the new input to the transmit sub-system.

Figure 1:
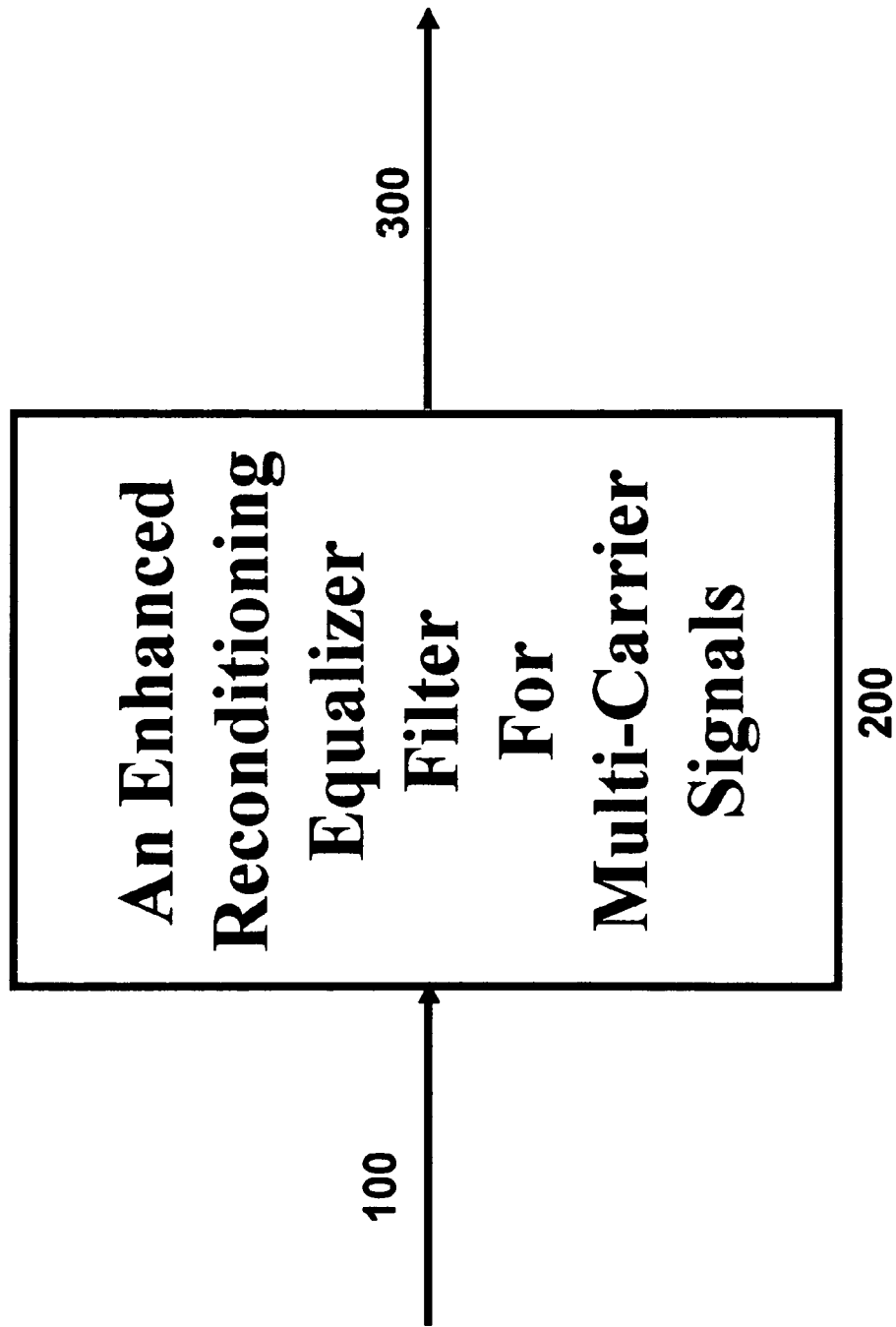
FIG. 1 is an overall block diagram of the enhanced reconditioning equalizer filter chain

Referring to FIG. 1, an enhanced reconditioning equalizer filter chain diagram is illustrated. The enhanced reconditioning equalizer filter chain 200 receives its baseband input 100 and produce conditioned and smoothened output 300. The enhanced reconditioning equalizer filter chain performs the following functions:

1. Reconditions and smoothens the amplitude of the input signal 100 before applying to transmitter sub-system.
2. Maintains the signal emission characteristic and quality.
3. Adjusts the gain in the signal paths to keep the total gain from input to output of the enhanced reconditioning equalizer filter chain unity.
4. Adjusts the out of band and in-band signal using a configurable low pass filter in a feedforward loop or by a stand alone feedforward loop.
5. Uses the individual baseband representatives of both main multi-carrier signal and peak reduced multi-carrier signal to recondition and smoothen the main multi-carrier signal.

Figure 2:
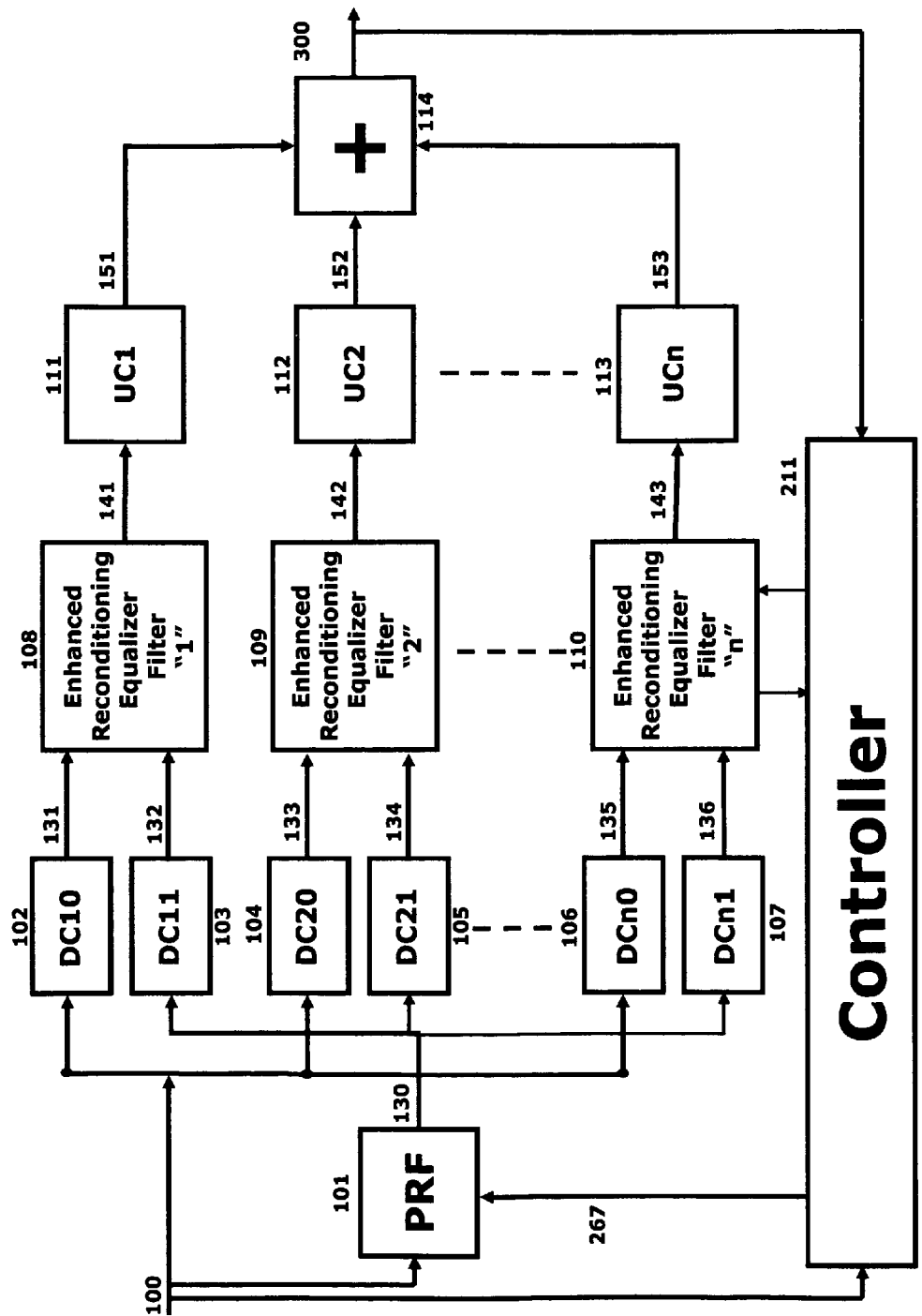
FIG. 2 is the detail block diagram of the enhanced reconditioning equalizer filter chain

FIG. 2 illustrate the detail block diagram of the enhanced reconditioning equalizer filter chain. The main multi-carrier baseband signal 100 is applied to down converters DC10 function 102, DC20 function 104, through DCn0 function 106 to produce the main individual baseband representative 131, 133, through 135 of each carrier within main multi-carrier baseband signal. The main multi-carrier baseband signal 100 is also applied to Peak Reduction Filter (PRF) function 101 to produce peak reduced main multi-carrier baseband signal 130. The amount of peak reduction is adjusted through parameter 267 supplied by controller 211. The peak reduced main multi-carrier baseband signal 130 is applied to down converters D11 function 103, DC21 function 105, through DCn1 function 107 to produce the main individual carrier baseband representative 132, 134, through 136 of each individual carrier within peak reduced main multi-carrier baseband signal. The first carrier's main baseband representative 131 and its peak reduced main baseband representative 132 are applied to enhanced reconditioning equalizer filter "1" function 108 to produce reconditioned and smoothen main baseband representative 141. The reconditioned and smoothen main baseband representative 141 is up converted to its original baseband frequency 151 by up converter UC1 function 111. The second carrier's baseband representative 133 and its peak reduced main baseband representative 134 are applied to enhanced reconditioning equalizer filter "2" function 109 to produce reconditioned and smoothened main baseband representative 142. The reconditioned and smoothened main baseband representative 142 is up converted to its original baseband frequency 152 by up converter UC2 function 112. The Nth carrier's main baseband representative 135 and its peak reduced main baseband representative 136 are applied to enhanced reconditioning equalizer filter "3" function 110 to produce reconditioned and smoothened main baseband representative 143. The reconditioned and smoothen main baseband representative 143 is up converted to its original baseband frequency 153 by up converter UCn function 113. The up converted reconditioned and smoothened signals 151, 152, and 153 are combined in summing bock 114 to produce the reconditioned and smoothened main baseband signal 300. In FIG. 2 only three of "N" individual carrier baseband representative of main baseband signal is shown.

Figure 3:
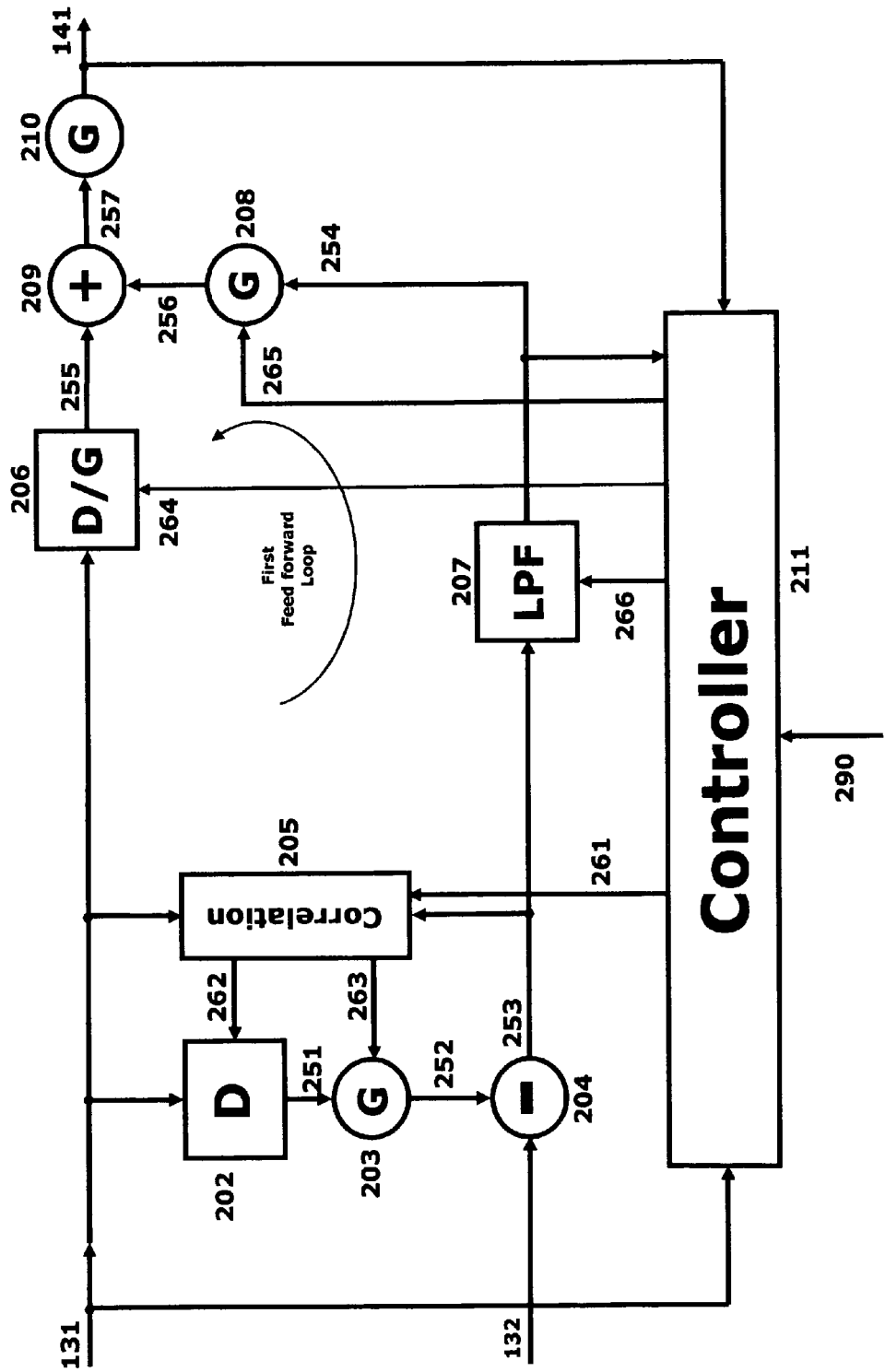
FIG. 3 is the detail block diagram of the enhanced reconditioning equalizer filter with configurable low pass filter in a first feedforward loop.

FIG. 3 illustrates the detail block diagram of the enhanced reconditioning equalizer filter "1" unit with configurable low pass filter. The main baseband signal 131 (which is the baseband representative of the main baseband multi-carrier signal) is delayed by delay block 202 to produced delayed main baseband signal 251. The delayed main baseband signal 251 is gain adjusted by gain block 203 to produce delay and gain adjusted main baseband signal 252. The delay and gain adjusted main baseband signal 252 is subtracted from peak reduced baseband signal 132 (which is the baseband representative of the peak reduced main baseband multi-carrier signal) in subtraction block 204 to produce baseband signal 253. The amount of delay 262 and gain adjustment 263 are calculated by the correlation block 205 that uses main baseband signal 131 and signal 253 as its input. The correlation block 205 also receives a control signal 261 from controller block 211 to use to calculate the delay amount 262 and gain adjustment 263. The baseband signal 253 is filtered by Low Pass Filter (LPF) block 207 to remove any out of band signal and produce in-band baseband signal 254. The coefficients of the Low Pass Filter (LPF) block 207 is configurable and supplied by controller 211 to adjust the amount of out of band rejection. The coefficient parameters 266 from controller 211 used by Low Pass Filter (LPF) block 207 can be set during configuration or automatically by monitoring the input signal 131 and output signal 141. The in-band baseband signal 254 is gain adjusted by gain block 208 to produced gain adjusted in-band baseband signal 256. The amount of gain adjustment 265 is supplied by controller block 211. The main baseband signal 131 is delay and gain adjusted by delay/gain block 206 to produce delay and gain adjusted main baseband signal 255. The delay and gain adjusted main baseband signal 255 and the gain adjusted in-band baseband signal 256 are summed in summation block 209 to produce modified main baseband signal 257. The modified main baseband signal 257 is gain adjusted by gain block 210 to produced reconditioned and smoothened baseband signal 141. The main baseband signal 131 and the modified baseband signal 141 are applied to controller 211 to provide the gain and delay parameters needed for the gain blocks and the correlation block. The enhance reconditioning equalizer filters "2" through "N" are identical to enhanced reconditioning equalizer filter "1".

Figure 4:
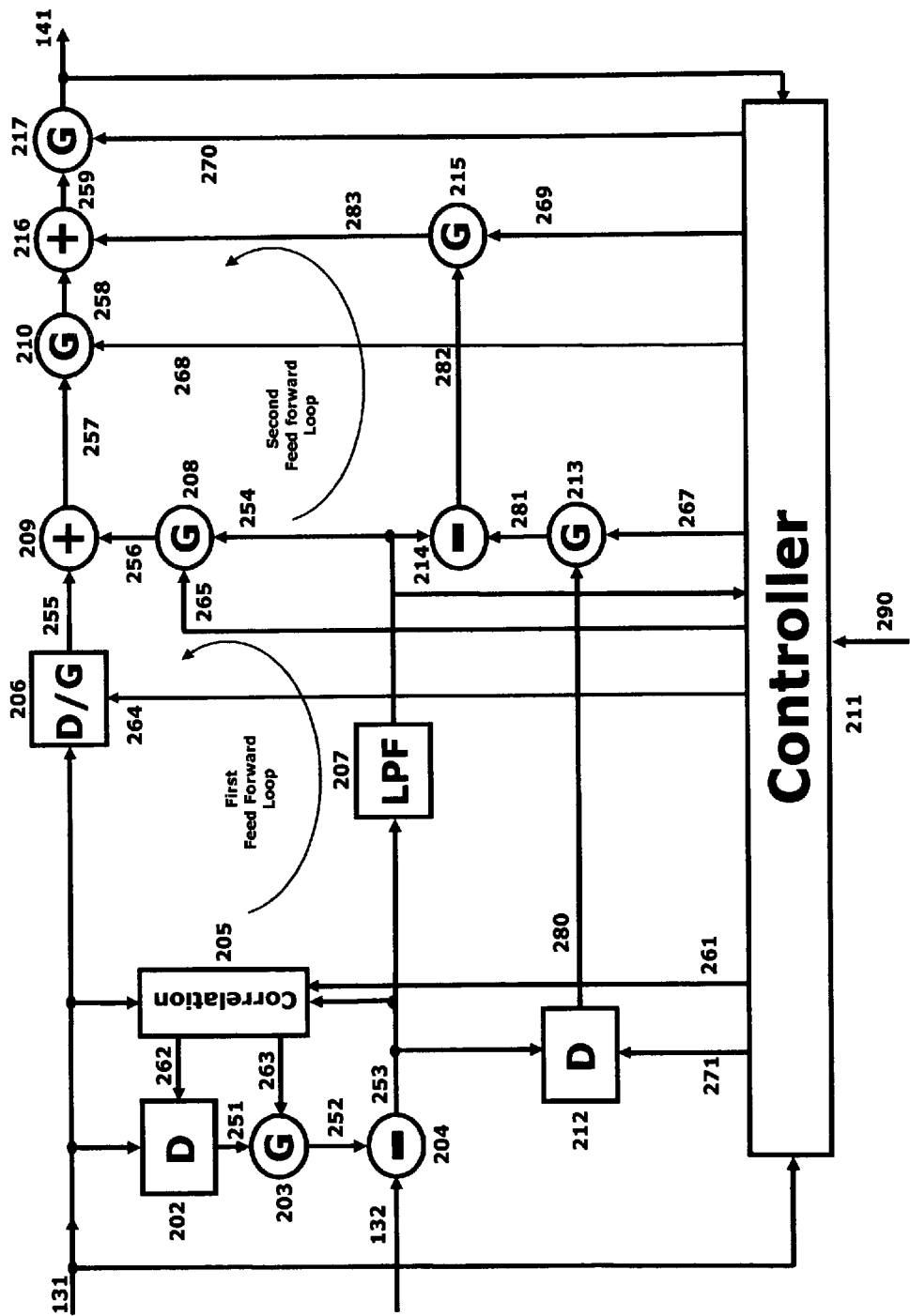
FIG. 4 is the detail block diagram of the enhanced reconditioning equalizer filter with adjustable out of band signal level through a second feedforward loop.

FIG. 4 illustrates the detail block diagram of the enhanced reconditioning equalizer filter "1" unit with adjustable out of band signal level. The main baseband signal 131 (which is the baseband representative of the main baseband multi-carrier signal) is delayed by delay block 202 to produced delayed baseband signal 251. The delayed baseband signal 251 is gain adjusted by gain block 203 to produce delay and gain adjusted baseband signal 252. The delay and gain adjusted baseband signal 252 is subtracted from peak reduced baseband signal 132 (which is the baseband representative of the peak reduced main baseband multi-carrier signal) in subtraction block 204 to produce baseband signal 253. The amount of delay 262 and gain adjustment 263 are calculated by the correlation block 205 that uses main baseband signal 131 and signal 253 as its input. The correlation block 205 also receives a control signal 261 from controller block 211 to use to calculate the delay amount 262 and gain adjustment amount 263. The baseband signal 253 is filtered by Low Pass Filter (LPF) block 207 to remove any out of band signal and produce in-band baseband signal 254. The in-band baseband signal 254 is gain adjusted by gain block 208 to produced gain adjusted in-band baseband signal 256. The amount of gain adjustment 265 is applied by controller block 211. The main baseband signal 131 is delay and gain adjusted by delay/gain block 206 to produce delay and gain adjusted main baseband signal 255. The delay and gain adjusted main baseband signal 255 and the gain adjusted in-band baseband signal 256 are summed in summation block 209 to produce modified main baseband signal 257. The modified main baseband signal 257 is gain adjusted by gain block 210. The baseband signal 253 is delayed by delay block 212 to produce baseband signal 280. The baseband signal 280 is gain adjusted by gain block 213 to produce baseband signal 281. The amount of delay adjustment 271 for delay block 212 and gain adjustment 267 for gain block 213 are supplied by controller block 211. The baseband signal 281 is subtracted from baseband signal 254 in subtraction block 214 to produce the out of band baseband signal 282. The out of band baseband signal 282 is gain adjusted by gain block 215 to produced gain adjusted out of band baseband signal 283. The out of band baseband signal 283 is added to main baseband signal 258 in summation block 216 to produce main baseband signal 259. The baseband signal 259 is gain adjusted by gain block 217 to produce baseband signal 141. The amount of gain control 270 for gain block 217 is supplied by controller 211. The main baseband signal 131 and the modified baseband signal 141 are applied to controller 211 to provide the gain and delay parameters needed for the gain blocks and the correlation block. The enhance reconditioning equalizer filters "2" through "N" are identical to enhanced reconditioning equalizer filter "1".

The invention claimed is:
1. An enhanced reconditioning equalizer filter chain for multi-carrier signals to enhance the performance of any communication transmitter, an enhanced reconditioning equalizer filter chain for multi-carrier signals comprising:
  a peak reduction filter to produce a peak reduced main multi-carrier baseband signal;
  a first down converter to down convert a main multi-carrier baseband signal to produce a baseband representative of each individual carrier of the main multi-carrier baseband signal;

a second down converter to down convert the peak reduced main multi-carrier baseband signal to produce a baseband representative of each individual carrier of the peak reduced main multi-carrier baseband signal;

a reconditioning equalizer filter to re-condition and smoothen the baseband representative of each individual carrier of the main multi-carrier baseband signal using the baseband representative of each individual carrier of the peak reduced main multi-carrier baseband signal, wherein the reconditioning equalizer filter comprises:

a first feedforward loop to inject a controlled in-band signal into the baseband representative of each individual carrier of the main multi-carrier baseband signal, comprising:

a first gain element in a first feedforward loop to adjust the gain of the baseband representative of each individual carrier of the main multi-carrier baseband signal;

a first delay element in a first feedforward loop to adjust the delay of the baseband representative of each individual carrier of the main multi-carrier baseband signal;

a subtractor that subtracts the delay and gain adjusted baseband representative of each individual carrier of the main multi-carrier baseband signal and the baseband representative of each individual carrier of the peak reduced main multi-carrier baseband signal;

a correlation function to correlate the baseband representative of each individual carrier of the main multi-carrier baseband signal and the result of the subtraction of the delay and gain adjusted baseband representative of each individual carrier of the main multi-carrier baseband signal and the baseband representative of each individual carrier of the peak reduced main multi-carrier baseband signal to calculate the amount of the delay and gain adjustment for the baseband representative of each individual carrier of the main multi-carrier baseband signal;

a digital FIR (or IIR) low pass filter with configurable coefficients to filter the result of the subtraction of the delay and gain adjusted baseband representative of each individual carrier of the main multi-carrier baseband signal and the baseband representative of each individual carrier of the peak reduced main multi-carrier baseband signal;

a second gain element to adjust the gain of the low pass filtered subtraction of the delay and gain adjusted baseband representative of each individual carrier of the main multi-carrier baseband signal and the baseband representative of each individual carrier of the peak reduced main multi-carrier baseband signal;

a delay and gain adjustment element to adjust the delay and gain of the baseband representative of each individual carrier of the main multi-carrier baseband signal;

a summer to add the delay and gain adjusted baseband representative of each individual carrier of the main multi-carrier baseband signal and the gain adjusted low pass filtered subtraction of the baseband representative of each individual carrier of the peak reduced main multi-carrier baseband signal and the delay and gain adjusted baseband representative of each individual carrier of the main multi-carrier baseband signal;

a third gain element to adjust the gain of the sum of the delay and gain adjusted baseband representative of each individual carrier of the main multi-carrier baseband signal and gain adjusted low pass filtered subtraction of the baseband representative of each individual carrier of the peak reduced main multi-carrier baseband signal and the delay and gain adjusted baseband representative of each individual carrier of the main multi-carrier baseband signal;

an upconverter that up converts the reconditioned and smoothened baseband representative of each individual carrier of the main multi-carrier baseband signal to its baseband signal frequency;

a summer that sums all of the up converted, reconditioned, smoothened and delay equalized baseband representatives of each individual carrier of the main multi-carrier baseband signal to produce the reconditioned and smoothened main multi-carrier baseband signal;

a controller that uses the baseband representative of each individual carrier of the main multi-carrier baseband signal, the output of the enhanced reconditioning equalizer filter for the baseband representative of each individual carrier of the main multi-carrier baseband signal, and external information to provide control signal to various delay and gain functions as well as the peak reduction filter, FIR low pass filter and the correlation function.

2. An enhanced reconditioning equalizer filter chain for multi-carrier signals according to claim 1, wherein an enhanced reconditioning equalizer filter used in the filter chain further comprises:

a second feedforward loop to inject a controlled out of band signal into the main baseband representative of each individual carrier of the main multi-carrier baseband signal, comprising:

a fourth gain element to adjust the gain of the subtraction of the delay and gain adjusted baseband representative of each individual carrier of the main multi-carrier baseband signal and the baseband representative of each individual carrier of the peak reduced main multi-carrier baseband signal;

a second delay element to adjust the delay of the subtraction of the delay and gain adjusted baseband representative of each individual carrier of the main multi-carrier baseband signal and the baseband representative of each individual carrier of the peak reduced main multi-carrier baseband signal;

a second subtractor to subtract the gain and delay adjusted subtraction of the delay and gain adjusted baseband representative of each individual carrier of the main multi-carrier baseband signal and the baseband representative of each individual carrier of the peak reduced main multi-carrier baseband signal and the low pass filtered subtraction of the delay and gain adjusted baseband representative of each individual carrier of the main multi-carrier baseband signal and the baseband representative of each individual carrier of the peak reduced main multi-carrier baseband signal;

a fifth gain element to adjust the gain of the subtraction of the gain and delay adjusted subtraction of the delay and gain adjusted baseband representative of each individual carrier of the main multi-carrier baseband signal and the baseband representative of each individual carrier of the peak reduced main multi-carrier baseband signal and the low pass filtered subtraction of the delay and gain adjusted baseband representative of each individual carrier of the main multi-carrier baseband signal and the baseband representative of each individual carrier of the peak reduced main multi-carrier baseband signal;

a summer to add the reconditioned and smoothened baseband representative of each individual carrier of the main multi-carrier baseband signal from a first feedforward loop with the second feedforward loop gain adjusted subtraction of the gain and delay adjusted subtraction of the delay and gain adjusted baseband representative of each individual carrier of the main multi-carrier baseband signal and the baseband representative of each individual carrier of the peak reduced main multi-carrier baseband signal and the low pass filtered subtraction of the delay and gain adjusted baseband representative of each individual carrier of the main multi-carrier baseband signal and the baseband representative of each individual carrier of the peak reduced main multi-carrier baseband signal;

a sixth gain element to adjust the gain of the sum of the conditioned and smoothened baseband representative of each individual carrier of the main multi-carrier baseband signal from a first feedforward loop with the second feedforward loop gain adjusted subtraction of the gain and delay adjusted subtraction of the delay and gain adjusted baseband representative of each individual carrier of the main multi-carrier baseband signal and the baseband representative of each individual carrier of the peak reduced main multi-carrier baseband signal and the low pass filtered subtraction of the delay and gain adjusted baseband representative of each individual carrier of the main multi-carrier baseband signal and the baseband representative of each individual carrier of the peak reduced main multi-carrier baseband signal.

3. An enhanced reconditioning equalizer filter chain for multi-carrier signals with different technologies according to claim 2, wherein the out of band signal of the baseband representative of each individual carrier of the main multi-carrier baseband signal is adjusted by a second feedforward loop that injects an adjustable out of band signal into the baseband representative of each individual carrier of the main multi-carrier baseband signal.

4. An enhanced reconditioning equalizer filter chain for multi-carrier signals according to claim 1, wherein the controller using the input and the output of the reconditioning equalizer filter controls the delay and gain adjustment elements used in the reconditioning equalizer filter.

5. An enhanced reconditioning equalizer filter chain for multi-carrier signals according to claim 1, wherein a Digital Signal Processing (DSP) function is implemented in programmable logic, Field Programmable Gate Array (FPGA), Gate Array, Application Specific Integrated Circuit (ASIC), or DSP processor.

* * * * *